(12) United States Patent
Wagle et al.

(10) Patent No.: US 11,286,845 B2
(45) Date of Patent: Mar. 29, 2022

(54) METHOD FOR SEQUENTIAL TURBO CONTROL

(71) Applicant: Caterpillar Inc., Deerfield, IL (US)

(72) Inventors: Shivangi Wagle, Peoria, IL (US);
Liangtao Zhu, San Antonio, TX (US);
Kevin Sergott, Dunlap, IL (US); Eric Schroeder, Germantown, IL (US);
Arvind Sivasubramanian, Peoria, IL (US); Travis Barnes, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 311 days.

(21) Appl. No.: 16/505,323

(22) Filed: Jul. 8, 2019

(65) Prior Publication Data
US 2021/0010411 A1    Jan. 14, 2021

(51) Int. Cl.
| *F02B 37/22* | (2006.01) |
|---|---|
| *F02B 37/00* | (2006.01) |
| *F02B 37/007* | (2006.01) |
| *F02D 17/02* | (2006.01) |
| *F02D 41/00* | (2006.01) |

(52) U.S. Cl.
CPC .......... *F02B 37/225* (2013.01); *F02B 37/002* (2013.01); *F02B 37/007* (2013.01); *F02D 17/02* (2013.01); *F02D 41/0007* (2013.01); *F02D 2200/0614* (2013.01); *F02D 2200/101* (2013.01)

(58) Field of Classification Search
CPC ...... F02B 37/22; F02B 37/225; F02B 37/001; F02B 37/002; F02B 37/007; F02D 17/02
See application file for complete search history.

(56) References Cited

U.S. PATENT DOCUMENTS

| 5,005,359 A * | 4/1991 | Tashima ................. F02B 37/18 60/600 |
|---|---|---|
| 5,351,486 A | 10/1994 | Yoshioka et al. |
| 6,055,812 A | 5/2000 | Trumbower |
| 8,640,459 B2 | 2/2014 | Ge et al. |
| 9,896,991 B2 * | 2/2018 | Smiljanovski ........ F02B 37/007 |
| 10,012,153 B2 | 7/2018 | Sivasubramaniam et al. |
| 10,208,685 B2 | 2/2019 | Brinkmann et al. |

FOREIGN PATENT DOCUMENTS

| CN | 105756774 A | 7/2016 |
|---|---|---|
| EP | 1645736 A1 | 4/2006 |
| WO | 2006092527 A1 | 9/2006 |

* cited by examiner

*Primary Examiner* — Ngoc T Nguyen
(74) *Attorney, Agent, or Firm* — Hibshman Claim Construction PLLC (57) ABSTRACT

A method for controlling and engine system with a plurality of turbochargers. At least one of the plurality of turbochargers has a turbine valve, a compressor valve, and actuators operable to change the position of the turbine valve. The method comprises controlling the actuator based on the presence of a transient event or a steady state event. During a transient event an engine control module can control the actuators to change the turbine valve to opened and closed positions and the turbine valve to a closed position based on the comparison between a corrected mass flow per turbocharger to a mass flow threshold.

20 Claims, 9 Drawing Sheets

METHOD FOR SEQUENTIAL TURBO CONTROL

TECHNICAL FIELD

The present disclosure generally pertains to multi-turbocharger control systems. More particularly this disclosure is directed towards a method for sequential turbo control.

BACKGROUND

An internal combustion engine may use a turbocharger to increase density of air and consequently the amount of air that enters the engine. The increased amount of air enables more fuel to be injected into the engine, thereby increasing engine power. A turbocharger generally includes a turbine, an air compressor, and a common shaft that connects the turbine to the air compressor. The turbine is driven by exhaust air that flows from an exhaust manifold. The air compressor is driven by the turbine to compress the air that enters an intake manifold.

U.S. Pat. No. 10,208,685 to Brinkmann, et al. describes embodiments for controlling boost pressure during transient conditions. In one example, a method includes, responsive to deactivation of a first turbine of a first turbocharger, deactivating an exhaust valve of a cylinder to flow exhaust air from the cylinder to a second turbine of a second turbocharger, and adjusting a speed of the second turbocharger via an electric machine coupled to the second turbocharger in a generator mode; and responsive to activation of the first turbine, activating the exhaust valve to flow exhaust air from the cylinder to the first turbine and the second turbine, and adjusting the speed of the second turbocharger via the electric machine in an auxiliary drive mode.

The present disclosure is directed toward overcoming one or more of the problems discovered by the inventors or that are known in the art.

SUMMARY

A method for controlling an engine system with a plurality of turbochargers is disclosed herein. At least one of the plurality of turbochargers having a turbo speed sensor, a turbine valve, a compressor valve, and actuators operable to change a position of the turbine valve to opened and closed positions and a position of the compressor valve to a closed position. The method comprising, receiving an engine speed. The method further comprising, generating a speed difference magnitude based on a desired speed and the engine speed. The method further comprising, generating a transient flag if the speed difference magnitude is greater than a transient detection speed error threshold. The method further comprising, generating a total mass airflow value. The method further comprising, generating a corrected mass flow per turbocharger using the total mass airflow value. The method further comprising, using an air cooler pressure drop correlation and the total mass airflow value to generate an expected pressure drop. The method further comprising, generating a compressor out pressure and a compressor in pressure. The method further comprising, generating a pressure ratio based on the compressor out pressure and the compressor in pressure. The method further comprising, using a mass flow threshold correlation of the at least one of the plurality of turbochargers to convert the pressure ratio into a mass flow threshold. The method further comprising, in response to the transient flag being generated, controlling the actuators to change the position of the turbine valve based on a comparison between the corrected mass flow per turbocharger to the mass flow threshold.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Figure 1:
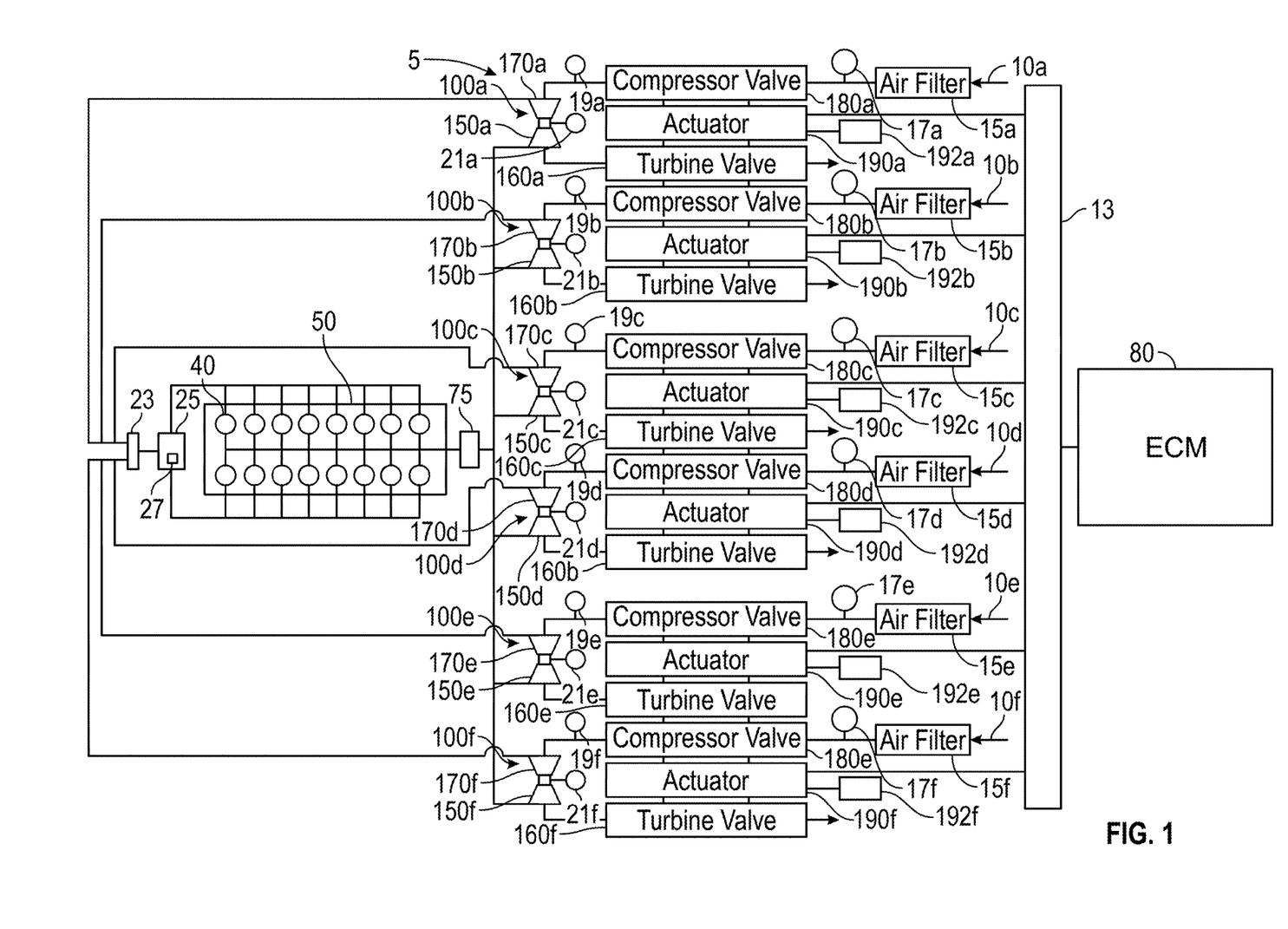
FIG. 1 is a functional block diagram of an exemplary engine system including multiple turbochargers and an engine control module.

FIG. 1 is a functional block diagram of an exemplary engine system including multiple turbochargers and an engine control module.

An engine system 5, for example for an engine for marine applications, includes an engine 50, turbochargers 100a-100f (also referred to as turbos), and an engine control module (ECM) 80. In an embodiment the engine system 5 includes six turbochargers 100a-f. Although six turbochargers 100a-f are shown in FIG. 1, the engine system 5 can include various numbers of turbochargers 100 such as one, two, three, four, five, six, seven, eight, nine, or more turbochargers 100. Each turbocharger 100a can include a turbine 150a and a compressor 170a. The disclosure may generally reference an upstream and downstream direction, where reference to "upstream" and "downstream" are associated with the flow direction of air 10, also referred to as gas, passing through the engine system 5 and exiting as exhaust. For example, the engine 50 is downstream of the compressors 170a-f and the engine 50 is upstream of the turbines 150a-f.

The turbochargers 100a-f and their sub-components can be referenced sequentially herein using ordinal numbers to facilitate association and description. For example, the first turbocharger 100a includes the first turbine 150a and the first compressor 170a. In further example the turbocharger 100b can be referenced as the second turbocharger 100b and the turbocharger 100c can be referenced as the third turbocharger 110c, and so on. In the following description, description directed to a reference number without a sub-letter, applies to each such element or component.

The engine system 5 can further include a plurality of air filters 15a-f. In one example, each turbocharger 100 has an associated air filter 15. The air filter 15 filters air 10 entering into the engine system 5. In an example one air filter 15 filters air 10 for multiple turbochargers 100.

As shown in FIG. 1 each of the turbines 150 includes a turbine valve 160a-f. However, in various examples one or more of the turbines 150a-f do not include a turbine valve 160.

Each of the compressors 170 can include a compressor valve 180. However, in various examples one or more of the compressors 170a-f do not include a compressor valve 180.

Air 10, also referred to as intake air, enters the engine system 5 for combustion, and enters through the air filter 15. A pressure gauge 17 is located between the air filter 15 and the compressor valve 180 and can be used for high inlet restriction detection and air filter diagnostics. The air 10 goes through the compressor valve 180 and into the compressor 170. A compressor in pressure (CIP) sensor 19 can be located between the compressor valve 180 and the compressor 170. The CIP sensor 19 can measure the pressure of the air 10 before it enters the compressor 170. The CIP sensor 19 can be used for diagnostic purposes.

The air 10 leaves the compressor 170 and passes through an air cooler 23. The air cooler 23 can comprise separate circuit after cooling (SCAC), charge air cooling (CAC), and other suitable cooling methods and systems. The air 10 is cooled by the air cooler 23 and enters the intake manifold 25. The intake manifold 25 can be a suitable conduit or conduits through which air 10 flows to enter the engine 50.

A manifold absolute pressure (MAP) sensor 27 is positioned to measure the pressure of the air 10 passing through the intake manifold 25. The air 10 is distributed from the intake manifold 25 to a plurality of cylinders 40 located within the engine 50. The plurality of cylinders 40 can include sixteen cylinders 40 (Shown in FIG. 1). The plurality of cylinders 40 can include two, three, four, five, six, seven, eight, nine, ten, eleven, twelve, thirteen, fourteen, fifteen, sixteen, seventeen, eighteen, nineteen, twenty, or more cylinders 40.

The air 10 is mixed with fuel and the mixture is combusted to move the cylinders 40. The exhaust created from the combustion is collected by an exhaust manifold 75. The exhaust manifold 75 may be any suitable conduit through which gases flow from. The exhaust manifold 75 distributes the exhaust to the turbochargers 100.

The turbochargers 100 can be positioned as inline turbochargers 100 and can receive exhaust, for example inboard exhaust from an engine for marine applications. The turbochargers 100 can include actuators 190a-f. Components of the turbochargers 100 can be actuated via the actuators 190 which can operate in response to turbo valve commands from the ECM 80. The actuators 190 can comprise, for example, a solenoid, a spool valve, RHA electronic actuator, and other similar devices. Each of the turbochargers 100 can have an oil supply/drain 192 that provides/removes oil to and from the turbochargers 100.

The actuators 190 can actuate the turbine valves 160 of the turbine 150 to open and closed positions based on turbo valve commands received by the ECM 80 described herein. If the turbine valve 160 of a turbine 150 is positioned open, then the turbine 150 is engaged, also referred to as the turbocharger 100 being engaged, "ON", or "added". If the turbine valve 160 of a turbine 150 is positioned closed, then the turbine 150 is disengaged, also referred to as the turbocharger 100 being disengaged, "OFF", or "dropped".

The compressor valve 180 can be actuated closed by the actuators 190 in response to turbo valve commands from the ECM 80. A wire harness can be used to provide an electrical communication medium between the ECM 80 and the actuators 190. The compressor valve 180 can be opened if the turbine valve 160 is open. The actuators 190 that closed the compressor valve 180 are in a deactivated position prior to being opened. The compressor valve 180 can be opened based on vacuum pressure generated downstream from the compressor valve 180. A mechanical device (not shown) can provided additional resistance to the compressor valve 180, such that the compressor valve 180 opens after a preset vacuum pressure is reached. For example, if the turbine valve 160 is positioned open, the compressor valve 180 can be opened by the vacuum pressure generated by the compressor 170 due to the spool up from the turbine 150. The compressor valve 180 can have an overcenter spring that holds the compressor valve open after the compressor valve 180 has been opened to prevent the compressor valve 180 from toggling between open and closed positions. If the turbine valve 160 is closed, the compressor valve 180 may not be opened, even if the preset vacuum pressure is reached.

The actuators 190 can control the turbine valve 160 and compressor valve 180 together. For example, the actuators 190 can close a turbine valve 160 while actuating the respective compressor valve 180 to close.

In an embodiment, at least one of the turbochargers 100 is a fixed turbocharger that is always "ON" or in use during operation of the engine system 5. For example, two, three or more turbochargers 100 are fixed turbochargers. In addition, the fixed turbocharges may not include a turbine valve 160 or a compressor valve 180. Further, the fixed turbocharges may not include a CIP sensor 19 or actuators 190.

The turbocharger 100 can include a turbo speed sensor 21 that measures the speed of a turbocharger 100. For example, one, two, three or more of the turbochargers 100 include the turbo speed sensor 21. In some embodiments with fixed turbochargers, the fixed turbochargers can each include the turbo speed sensor 21 while the turbochargers 100 that are not fixed, do not include turbo speed sensors 21. In an embodiment, all of the turbochargers 100 each include a turbo speed sensor 21.

Figure 2:
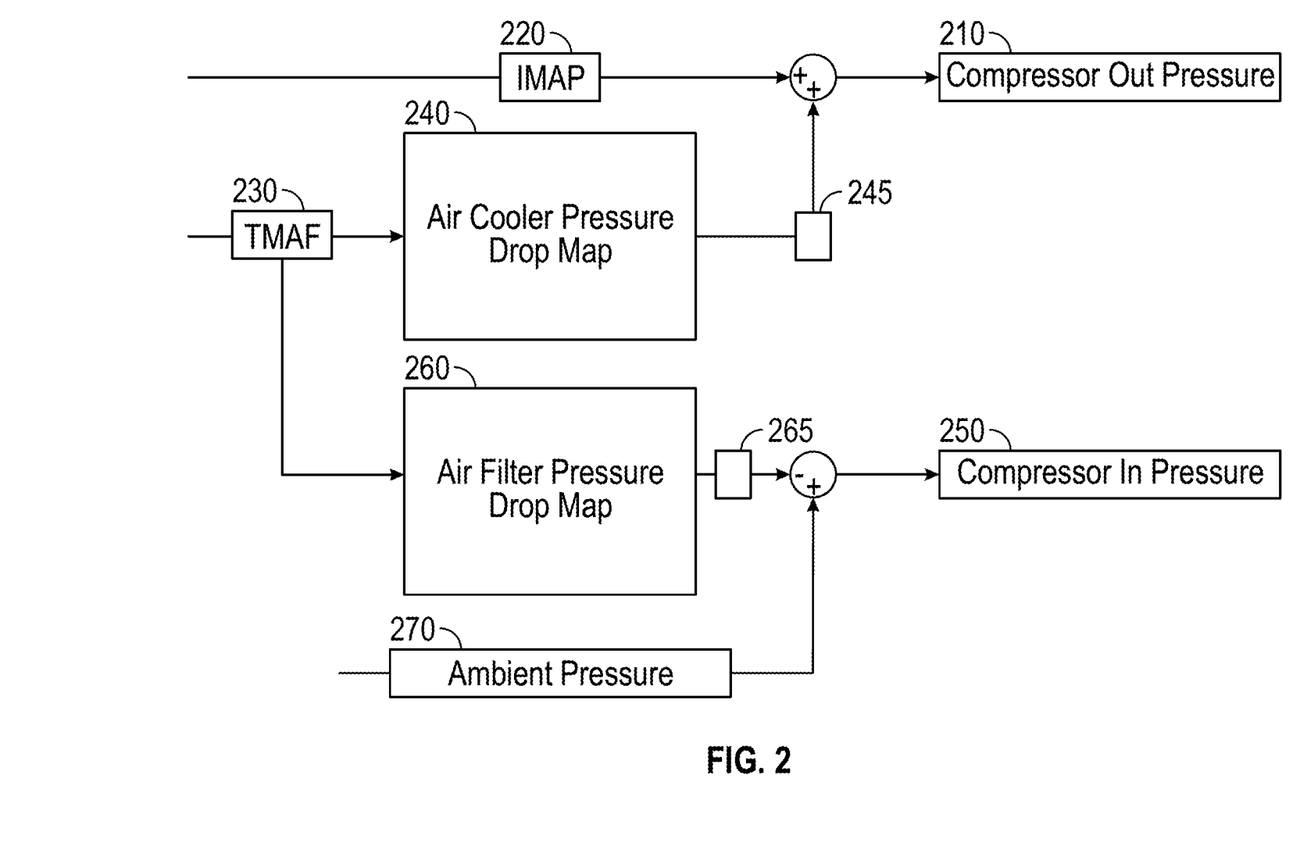
FIG. 2 is a schematic representation of a process for estimating compressor in pressure and compressor out pressure.

FIG. 2 is a schematic representation of a process for estimating compressor in pressure and compressor out pressure. The process represented by FIG. 2 can be implemented, for example, by the ECM 80 of FIG. 1. A compressor out pressure 210 can be estimated based on a measured pressure value 220 (IMAP) from the MAP sensor 27 (shown in FIG. 1), a total mass airflow (TMAF) value 230 that can be generated by using information generated by the MAP sensor 27 along with other information such as engine speed, intake manifold air temperature, and other sensor information, and an air cooler pressure drop correlation 240 related to the air cooler 23 (shown in FIG. 1). The air cooler pressure drop correlation 240 can comprise a SCAC pressure drop map or calculation, a CAC pressure drop map or calculations, and other pressure drop maps, calculations, and correlations and represent the relationship between TMAF and pressure drop through the air cooler.

The air cooler pressure drop correlation 240 can be used to convert the TMAF value 230 into an expected pressure drop 245 that the air 10 (shown in FIG. 1) experiences passing through the air cooler 23. The expected pressure drop 245 can be added with the measured pressure value 220 to generate the compressor out pressure 210.

A compressor in pressure 250 can be estimated based on the total mass air flow (TMAF) value 230, an air filter pressure drop correlation 260 related to the air filter 15 (shown in FIG. 1), and ambient pressure 270 (typically around 101.3 kPa). The air filter pressure drop correlation 260 can be an air filter pressure drop map, calculation, or other correlation and can represent the relationship between TMAF and pressure change through the air filter 15. The air filter pressure drop correlation 260 can be used to convert the TMAF value 230 into an expected pressure drop from air filter 265 that the air 10 (shown in FIG. 1) experiences passing through the air filter 15. The ambient pressure 270 can be atmospheric pressure, generally around 101.3 kPa, or can be higher or lower than atmospheric pressure. The compressor in pressure 250 can be based on the expected pressure drop from the air filter 265 and the ambient pressure 270. The expected pressure drop from air filter 265 can be subtracted from the ambient pressure 270 to generate the compressor in pressure 250. In an example, the TMAF value 230 can be substituted with the compressor mass flow in embodiments that include an air filter 15 per turbocharger 100.

In other examples, the compressor in pressure 250 is estimated in other ways. For example, the compressor in pressure 250 can be based on converting the TMAF value 230 to a volumetric air flow based on temperature. The compressor in pressure 250 may also be measured through the use of measuring devices and sensors such as the CIP sensor 19.

The estimated compressor out pressure 210 and pressure in pressure 250 values can be generated and used by the ECM 80 (shown in FIG. 1) and be used in processes discussed in greater detail below.

Figure 3:
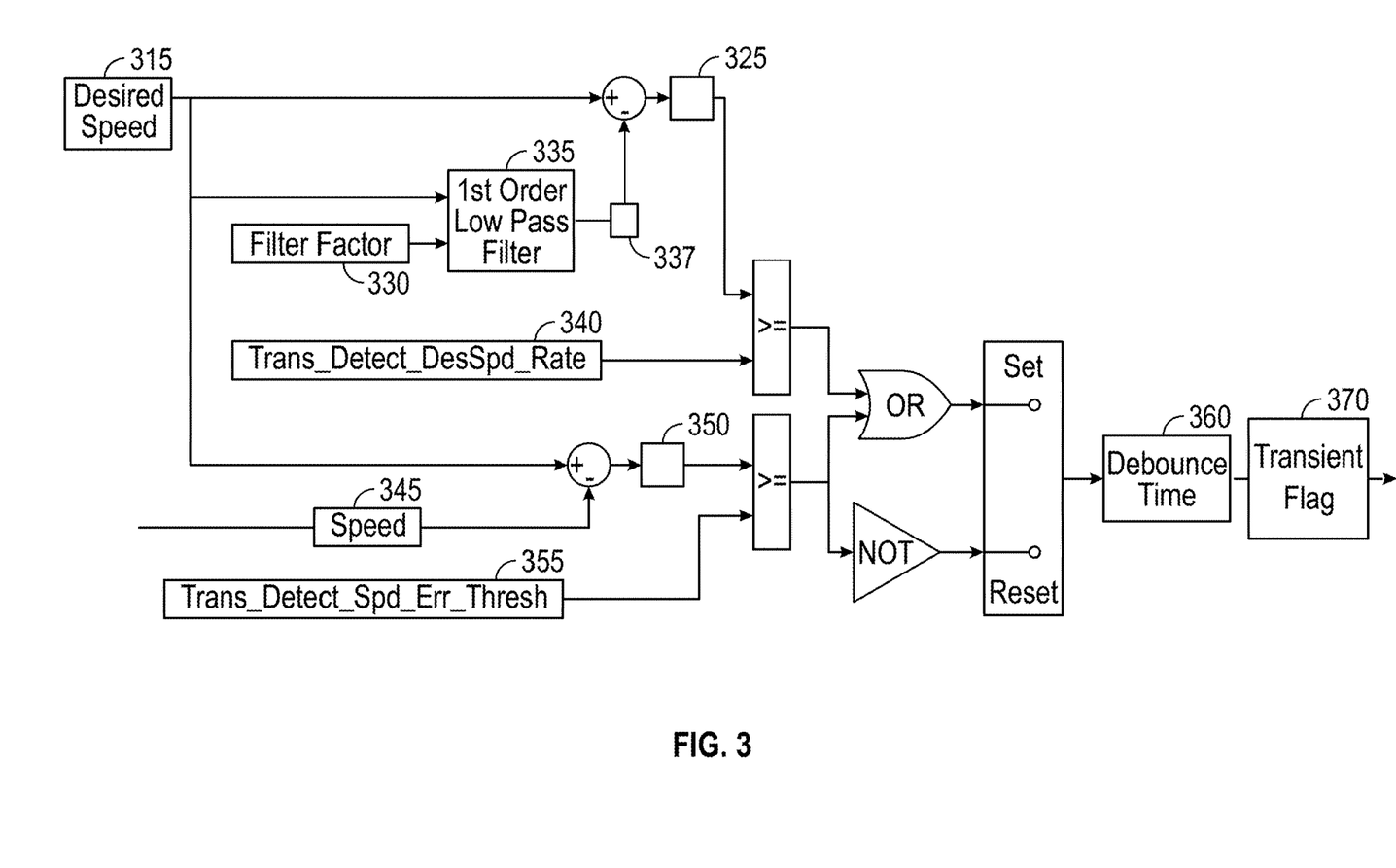
FIG. 3 is a schematic representation of a process for generating a transient flag.

FIG. 3 is a schematic representation of a process for generating a transient flag. The process represented by FIG. 3 can be implemented, for example, by the ECM 80 of FIG. 1. A transient flag 370 (indicating a transient condition of the engine system 5) can be generated based on desired speed 315, a filter factor 330, a first order low pass filter 335, a transient detection desired speed rate 340, engine speed 345, and a transient detection speed error threshold 355.

The desired speed 315 can be a generated engine speed and may be rapidly changing. The filter factor 330 is used to set the cut off frequency of the first order low pass filter 335.

The first order low pass filter 335 can used with the desired speed 315 and the filter factor 330 to generate a filtered desired speed value 337. The desired speed 315 can change faster than the filtered desired speed value 337 generated by the first order low pas filter 335. During steady state conditions the desired speed 315 can change slowly and the filtered desired speed 337 can be generally the same as the desired speed 315. During transient conditions the desired speed 315 can be changing fast, leading to a larger difference between the filter desired speed value 337 and the desired speed value 315.

The first order low pass filter 335 can be based on a time constant that is slower than the stepped sampling time of the desired speed value 315. The first order low pass filter 35 can be a digital representation of a stand analog low pas filter. The first order low pas filter 335 can generate different desired speed values and the difference can be used to indicate a transient event.

The absolute value of the difference between the filtered desired speed value 337 and the desired speed value 315 can generate the desired speed difference magnitude 325. The absolute value allows for the detection of transients with the engine speed increasing or decreasing.

The transient detection desired speed rate 340 can be a calibration that may vary based on the application. The transient detection desired speed rate 340 can vary on different engines 50 and be based on how fast of a desired speed ramp is selected to quantify as transient.

The engine speed 345 can be the speed of the engine 50. The absolute value of the difference between the engine speed 345 and the desired speed 315 can generate the speed difference magnitude 350. The absolute value allows for the detection of transients with the engine speed increasing or decreasing.

The transient detection desired speed rate 340 can be a calibration that may vary based on the application. The transient detection desired speed rate 340 can vary on different engines 50 and be based on when it is desired to generate a transient flag 370.

If desired speed difference magnitude 325 is greater than or equal to the transient detection desired speed rate 340 or if the speed difference magnitude 350 is greater than the transient detection speed error threshold 355, then a transient flag 370 can be generated.

However, if the speed difference magnitude 350 is not greater than the transient detection speed error threshold 355, then a transient flag 370 is not generated and the process can be reset and followed again. A debounce time 360 can help mitigate toggling between a steady state and transient modes too often. In an example the debounce time 360 can range from zero to five seconds. In another example the debounce time 360 is greater than five seconds.

Transient flags 370 can be generated using other methods and the methods may vary depending on the application. In an example, the engine system 5 (FIG. 1) can be for energy generation, such as genset applications. In genset applications, generation of transient flag 370 can be generated based on desired fuel consumption rather than speed. Similar to the process with respect to speed, the process for genset applications can generate a transient flag based on desired fuel consumption a fuel consumption filter factor, a fuel consumption first order low pass filter, a transient detection desired fuel consumption rate, fuel consumption, and a transient detection fuel consumption error threshold.

Figure 4:
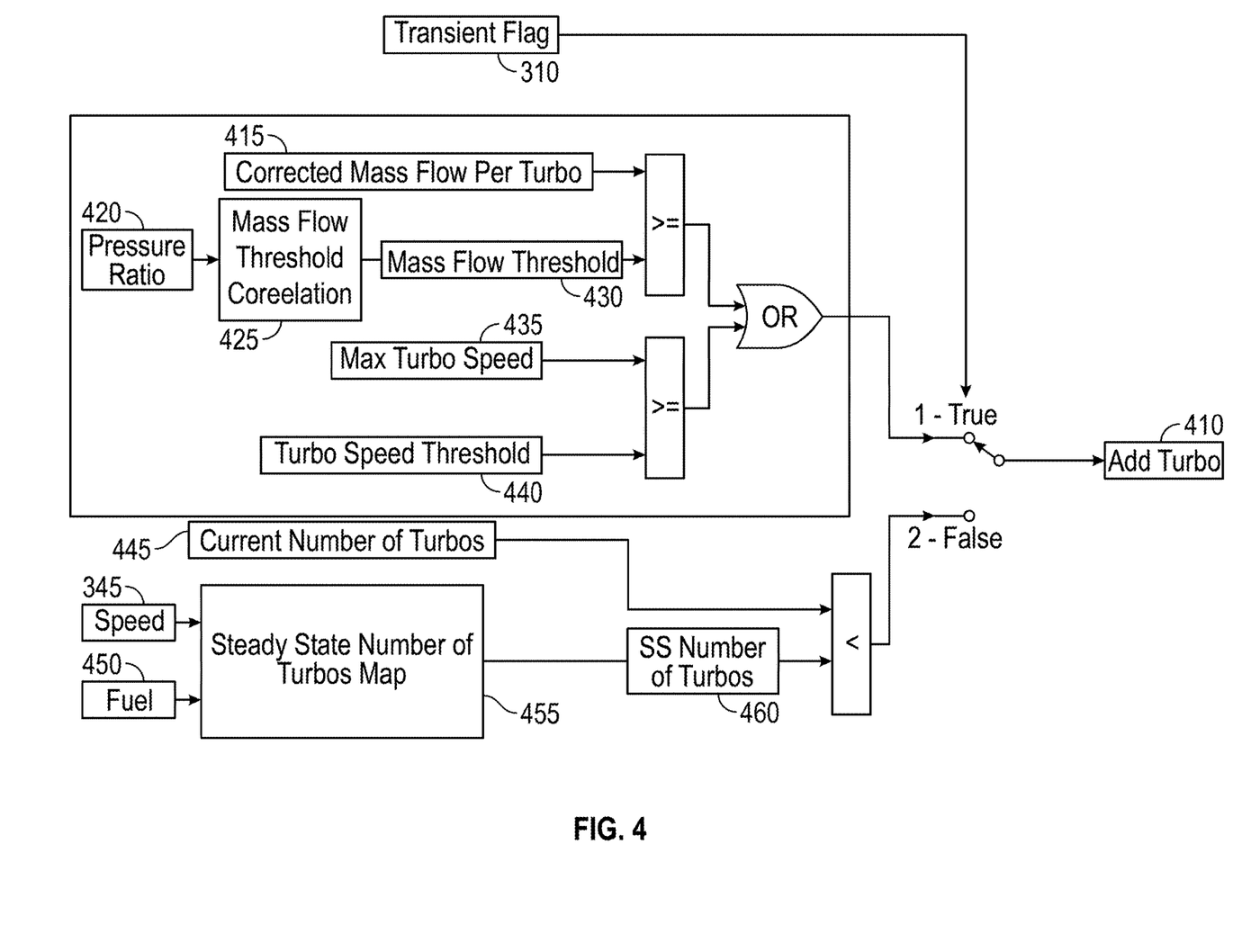
FIG. 4 is a schematic representation of a process for generating an add turbo flag while a transient flag is active.

FIG. 4 is a schematic representation of a process for generating an add turbo flag while a transient flag is active. The process represented by FIG. 4 can be implemented, for example, by the ECM 80 of FIG. 1. An add turbo flag 410 (also referred to as add turbo) can be generated based on a transient flag 370 being active, a corrected mass flow per turbocharger 415, a pressure ratio 420, a mass flow threshold correlation 425, a mass flow threshold 430, a maximum turbocharger speed 435, a turbo speed threshold 440, a current number of turbochargers 445, an engine speed 345 (shown in FIG. 4 and FIG. 5), a fuel amount 450 (also referred to as fuel), a steady state number of turbochargers correlation 455, a steady state number of turbos 460.

The corrected mass flow per turbocharger 415 can be generated by using the TMAF 230, current number of turbochargers 445, compressor in pressure 250, the ambient pressure 270, a compressor inlet temperature, and a reference temperature (such as ambient temperature). For example, the corrected mass flow per turbocharger 415 can be:

Corrected mass flow per turbocharger=[(TMAF 230/
current number of turbochargers 445)/(compressor in pressure 250/ambient pressure 270)]*
[(compressor inlet temperature/reference
temperature)^(½)]

In the above equation, the TMAF 230 can be represented in kilograms per second, the pressures can be represented in kilopascals, and the temperatures can be represented in Kelvin.

The pressure ratio 420 can be based on the compressor out pressure 210 and the compressor in pressure 250 (shown in FIG. 2). For example, the pressure ratio 420 can be generated by dividing the compressor out pressure 210 by the compressor in pressure 250 (shown in FIG. 2).

The mass flow threshold correlation 425 can be a map, calculation, or other correlation and can represent the relationship between the pressure ratio 420 and the mass flow threshold 430. The mass flow threshold correlation 425 can be based on optimization of the engine 50 performance, turbocharger 100 performance, engine 50 response, or other factors. The mass flow threshold correlation 425 can be used to convert the pressure ratio 420 into the mass flow threshold 430. If the corrected mass flow per turbocharger 415 is greater than or equal to the mass flow threshold 430, and a transient flag 370 is present, the add turbo flag 410 is generated and a turbocharger 100 can be added. In other words, if the mass flow threshold 430 is less than the corrected mass flow per turbocharger 415, the actuators 190 can be controlled to open a turbine valve 160 in response to a transient flag 370 being generated and detected.

The maximum turbo speed 435 can be generated by receiving the turbo speed information measured by the turbo speed sensors 21 (FIG. 1) and selecting the highest speed value. The turbo speed threshold 440 can be a constant value that is based on the hardware safety specifications of the turbochargers 100. The turbo speed threshold 440 can prevent the turbochargers 100 from operating too fast and help prevent damage to turbochargers 100 while accelerating to higher operating speeds. If the maximum turbo speed 435 is greater than or equal to the turbo speed threshold 440, and a transient flag 370 is present, the add turbo flag 410 is generated and a turbocharger 100 can be added. In other words, if the turbo speed threshold 400 is less than the maximum turbo speed 435, the actuators 190 can be controlled to open a turbine valve 160 in response to a transient flag 370 being generated and detected.

The fuel amount 450 can be a volume or weight of fuel being used by the engine system 5. The steady state number of turbos correlation 455 can be a map, calculation, or other correlation and can represent the relationship between the fuel amount 450 and the engine speed 345 to the steady state number of turbos 460. The steady state number of turbo correlation 455 can be used to convert the fuel amount 450 and engine speed 345 into the steady state number of turbos 460 to meet emissions and selective catalytic reduction (SCR) requirements. In an example, the steady state number of turbos 460 can bases on other factors such as exhaust temperatures and efficiency impacts due to back pressure.

If the current number of turbos 445 is less than the steady state number of turbos 460, and a transient flag 370 is not present, the add turbo flag 410 is generated and a turbocharger 100 can be added. In other words, if the steady state number of turbos 460 is greater than the current number of turbos 445 the actuators 190 can be controlled to open a turbine valve 160 in response to when a transient flag 370 is not generated and detected.

Figure 5:
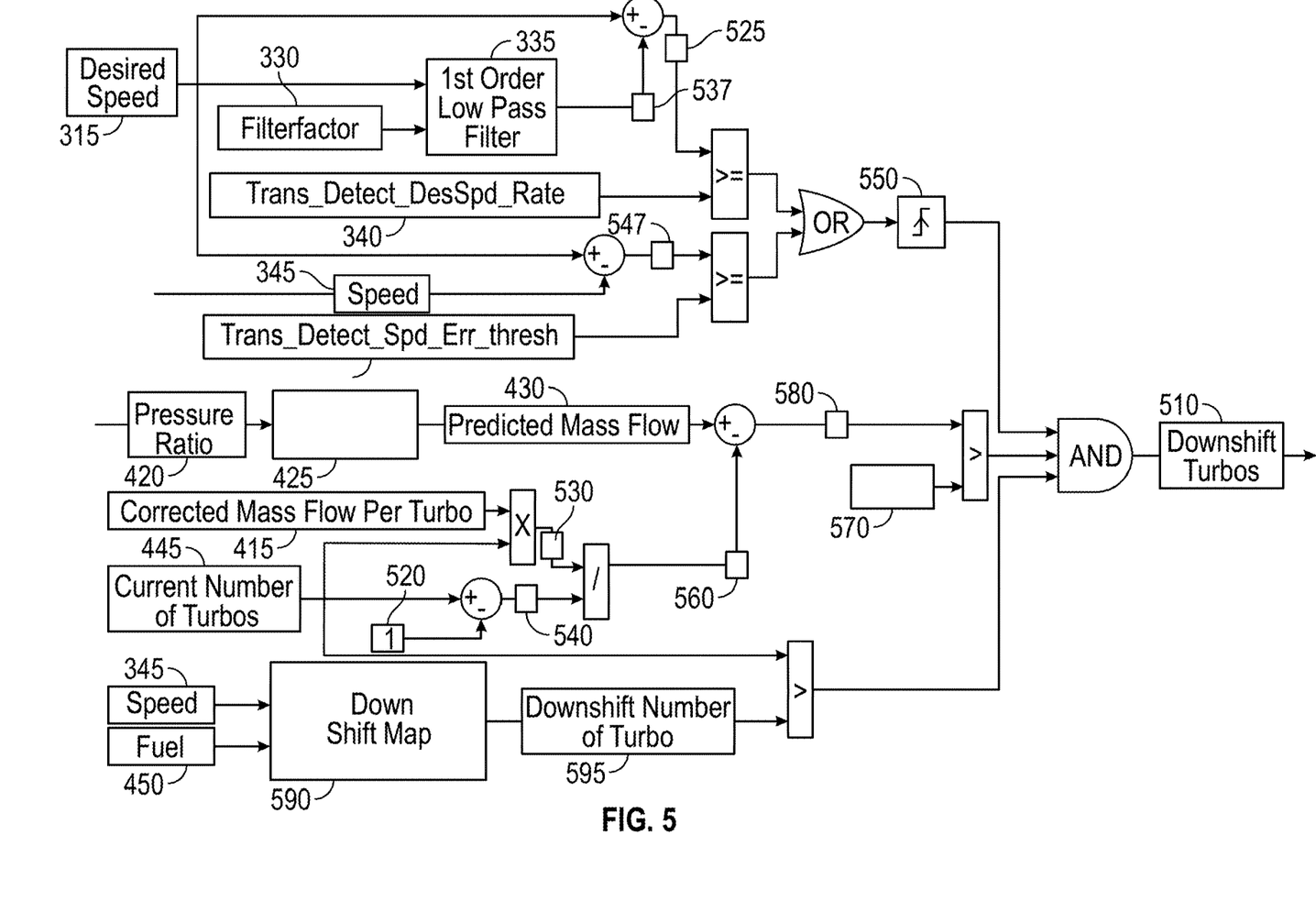
FIG. 5 is a schematic representation of a process for generating a downshift turbo flag.

FIG. 5 is a schematic representation of a process for generating a downshift turbo flag. The process represented by FIG. 5 can be implemented, for example, by the ECM 80 of FIG. 1. It can be beneficial for a turbo 100 to be removed to help with transients while increasing engine speed 345. At steady state conditions, the engine system 5 may run with a specific number of turbochargers 100 to meet temperature requirements. During the transition from steady state conditions to transient conditions, a turbocharger 100 can be removed to spool up the remaining turbochargers 100 before adding a turbocharger 100 back in. Removing a turbocharger 100 can increase the mass flow through the remaining turbochargers 100, and lead to raising the speed of the turbochargers 100 and facilitating with faster transient transitions. Checks can be made while entering the transient conditions, based on where the turbochargers 100 are operating within the mass flow threshold correlation 425 with regards to the add turbo 410 logic path and to check if there is enough distance between the add turbo 410 to remove and add a turbocharger 100. In other words, there is not enough energy in the exhaust to spool up to turbochargers 100 to accommodate the desired acceleration of the engine 50 and this could lead to a stall. One of the turbochargers 100 is dropped/removed to spool up the turbochargers 100. Once the turbochargers 100 are spooled high enough, a turbocharger 100 can be added back in during acceleration of the engine 50.

A downshift transient flag 550 can be generated based on the desired speed 315, the filter factor 330, the first order low pass filter 335, the transient detection desired speed rate 340, the engine speed 345, and the transient detection speed error threshold 355.

The difference between the filtered desired speed value 537 and the desired speed value 315 can generate a filtered desired speed difference 525. If the filtered desired speed difference 525 is greater than or equal to the transient detection desired speed rate 340 then a downshift transient flag 550 is generated.

The difference between the engine speed 345 and the desired speed 315 can generate the desired speed difference 547. If the desired speed difference 547 is greater than the transient detection speed error threshold 355, then a downshift transient flag 550 is generated.

The downshift turbo flag 510 can be based on the downshift transient flag 550 being active, the corrected mass flow per turbocharger 415, the pressure ratio 420, the mass flow threshold correlation 425, the mass flow threshold 430, the current number of turbochargers 445, the engine speed 345, the fuel amount 450, a downshift correlation 590, a downshift number of turbochargers 595, and the downshift allowed mass flow threshold 570.

The corrected mass flow per turbocharger 415 is multiplied by the current number of turbos 445 to generate a total corrected mass flow 530. A set constant number of turbochargers 520 can be set to 1. The set constant number of turbochargers 520 can be subtracted from the current number of turbos 445 to generate the effective number of turbochargers 540. The total corrected mass flow 530 can be divided by the effective number of turbochargers 540 to generate the effective mass flow per turbocharger 560. In an example, the effective mass flow per turbocharger 560 can be used to estimate where the engine 50 would be operating with one less turbocharger 100. The effective mass flow per turbocharger 560 can be used to avoid adding back a turbocharger 100 immediately after a downshift event due to crossing the add turbo logic threshold.

The difference of mass flow 580 can be based on the effective mass flow per turbocharger 560 and the mass flow threshold 430. The effective mass flow per turbocharger 560 can be subtracted from the mass flow threshold 430 to generate the difference of mass flow 580.

The downshift correlation 590 can be calibrated based on the specific engine 5 used and smoke requirements. The downshift correlation 590 can be a map, calculation, or other correlation and can represent the relationship between the engine speed 345 and the fuel amount 450 to the downshift number of turbochargers 595. The downshift correlation 590 can be used to convert the relationship between the engine speed 345 and the fuel amount 450 to generate the downshift number of turbochargers 595.

The downshift allowed mass flow threshold 570 can be based on the supplier mass flow threshold correlation 425, along with calibration parameters, taking into account hysteresis.

If the downshift transient flag 550 is generated, and the difference of mass flow 580 is greater than the downshift allowed mass flow threshold 570, and the current number of turbos 445 is greater than the downshift number of turbochargers 595, then a downshift turbo flag 510 is generated.

Figure 6:
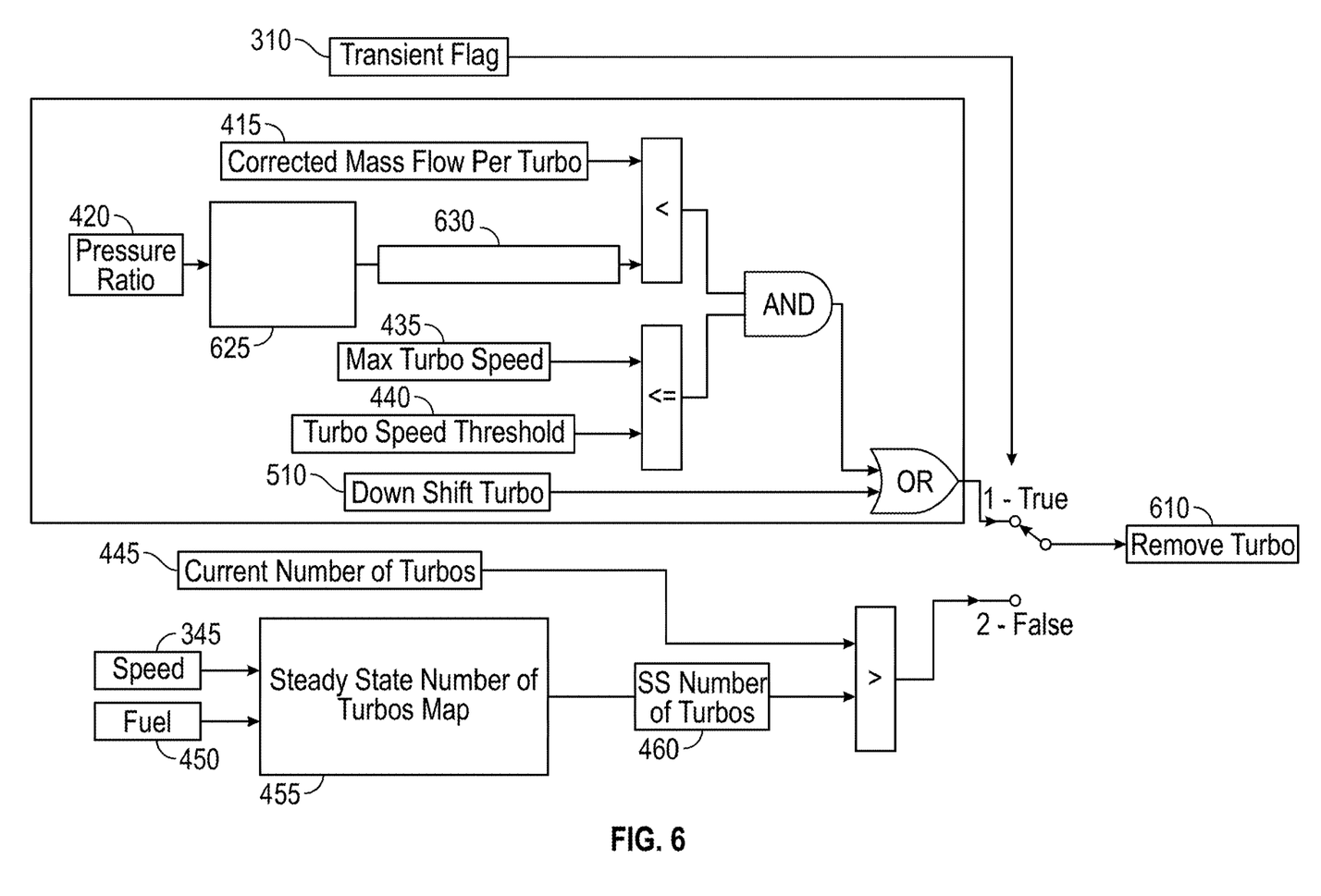
FIG. 6 is a schematic representation of a process for generating a remove turbo flag while a transient flag is active.

FIG. 6 is a schematic representation of a process for generating a remove turbo flag while a transient flag is active. The process represented by FIG. 6 can be implemented, for example, by the ECM 80 of FIG. 1. A remove turbo flag 610 can be generated based on the transient flag 370 being active, the corrected mass flow per turbocharger 415, the pressure ratio 420, a remove turbo mass flow threshold correlation 625, the remove turbo mass flow threshold 630, the maximum turbocharger speed 435, the turbo speed threshold 440, a downshift turbo flag 510, the current number of turbochargers 445, the engine speed 345, the fuel amount 450, the steady state number of turbochargers correlation 455, and the steady state number of turbos 460.

The remove turbo mass flow threshold correlation 625 can be based on optimizing the engine 50 performance and turbocharger performance 100.

If the corrected mass flow per turbocharger 415 is less than to the mass flow threshold 630 and the maximum turbo speed 435 is less than or equal to the turbo speed threshold 440, and a transient flag 370 is present, then the remove turbo flag 610 is generated and a turbocharger 100 can be removed. In other words, if the mass flow threshold 630 is greater than the corrected mass flow per turbocharger 415 and the maximum turbo speed 435 is not greater than the turbo speed threshold 440, then the actuators 190 can be controlled to close the turbine valve 160 and can also close the compressor valve 180, in response to a transient flag 370 being generated and detected. These two checks can provide a safe limit that mitigates over speeding the active turbochargers 100 by removing a turbocharger 100.

The downshift turbo flag 510 can be generated when the engine system 5 downshifts. If the downshift turbo flag 510 occurs, and a transient flag 370 is present, then the remove turbo flag 610 is generated and a turbocharger 100 can be removed. In other words, if the downshift turbo flag 510 is generated, then the actuators 190 can be controlled to close the turbine valve 160 and can also close the compressor valve 180, in response to a transient flag 370 being generated and detected.

If the current number of turbos 445 is greater than the steady state number of turbos 460, and a transient flag 370 is not present, the remove turbo flag 610 is generated and a turbocharger 100 can be removed. In other words, if the steady state number of turbos 460 is less than the current number of turbos 445, then the actuators 190 can be controlled to close the turbine valve 160 and can also close the compressor valve 180, in response to when a transient flag 370 is not generated and detected.

Figure 7:
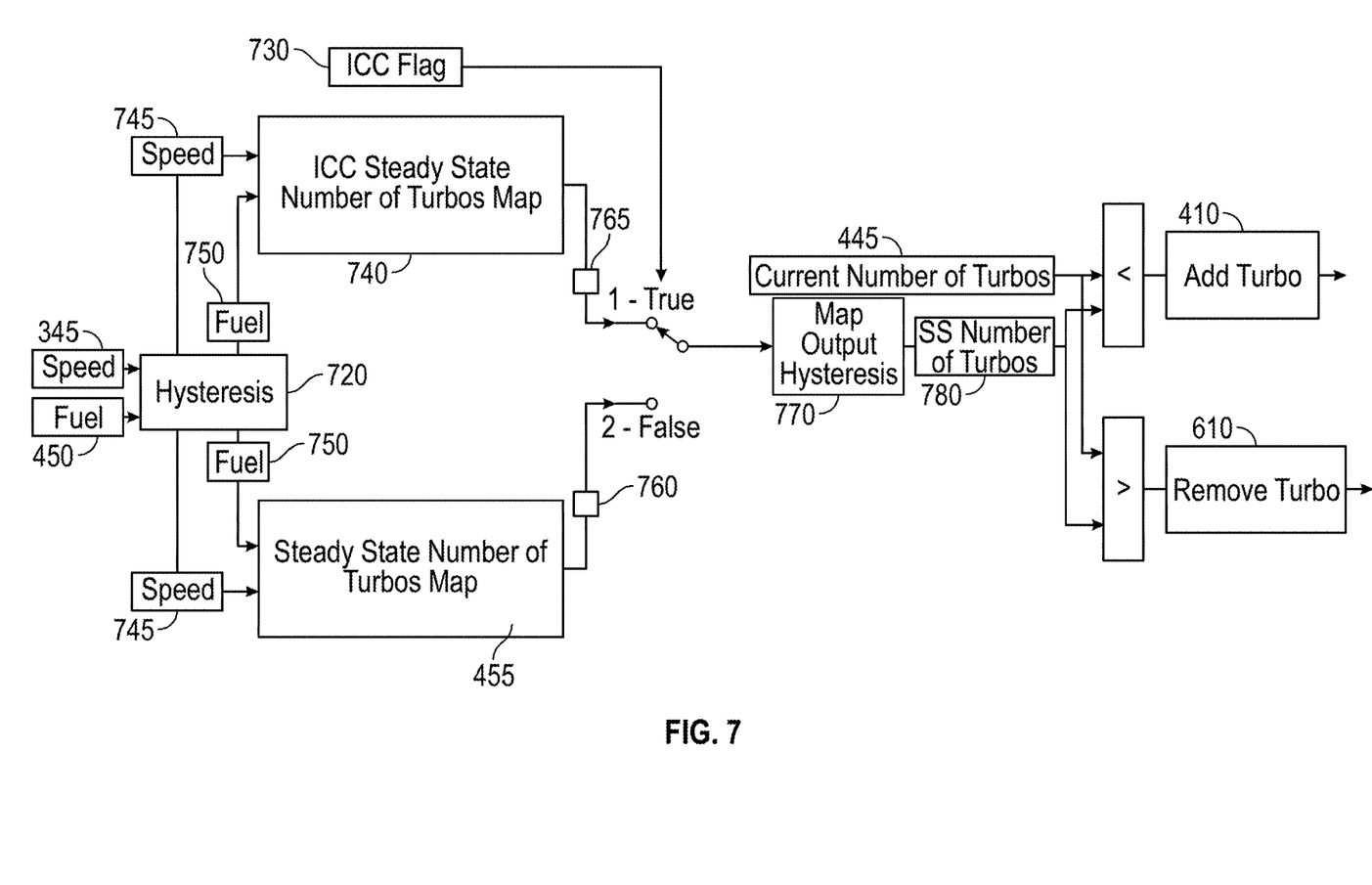
FIG. 7 is a schematic representation of a process for generating a remove turbo flag or an add turbo flag while an idle cylinder cut flag is active.

FIG. 7 is a schematic representation of a process for generating a remove turbo flag or an add turbo flag while an idle cylinder cut flag is active transient flag is not active. The process represented by FIG. 7 can be implemented, for example, by the ECM 80 of FIG. 1. While the engine system 5 is running in steady state conditions and not in low idle, the number of steady state turbochargers 460 and a number of idle cylinder cut (ICC) steady state number of turbochargers 760 can be generated by using the steady state number of turbos correlation 455 and an idle cylinder cut steady state number of turbos correlation 740.

An idle cylinder cut flag 730 can be generated/active when some of the cylinders 40 are cut out of operation. For example, this may occur during some operating conditions of the engine system 5 such as at low loads. A reduced number of operating cylinders 40 can change the optimum number of turbochargers 100 active. To account for a change in engine 5 operation with a reduced number of cylinders 40, an idle cylinder cut steady state number of turbos correlation 740 can be used.

The fuel amount 450 and the engine speed 345 can be processed through hysteresis 720 to generate a hysteresis fuel amount 750 and hysteresis engine speed 745 and mitigate toggling between 2 and 3 turbo states while in steady state conditions.

The idle cylinder cut steady state number of turbos correlation 740 can be a map, calculation, or other correlation and can represent the relationship between the hysteresis engine speed 745 and hysteresis fuel amount 750 to the idle cylinder cut steady state number of turbos 765. The Idle cylinder cut steady state number of turbos correlation 740 can be used to convert the hysteresis engine speed 745 and hysteresis fuel amount 750 into the idle cylinder cut steady state number of turbos 765.

The steady state number of turbos correlation 455 can represent the relationship between the hysteresis engine speed 745 and hysteresis fuel amount 750 with the hysteresis steady state number of turbos 760. The steady state number of turbos correlation 455 can be used to convert the hysteresis engine speed 745 and hysteresis fuel amount 750 into the hysteresis steady state number of turbos 760.

The ICC steady state number of turbochargers 765 and steady state number of turbochargers 760 can be processed through hysteresis 770 to mitigate toggling between 2 and 3 turbo states while in steady state conditions. The output from the hysteresis 770 can be a hysteresis steady state number of turbochargers 780. If the current number of turbos 445 is less than the hysteresis steady state number of turbochargers 780 during an active idle cylinder cut flag 730, then the add turbo flag 410 is generated and a turbocharger 100 can be added. If the current number of turbos 445 is greater than the hysteresis steady state number of turbochargers 780 during an active idle cylinder cut flag 730, then the remove turbo flag 610 is generated and a turbocharger 100 can be removed.

Figure 8:
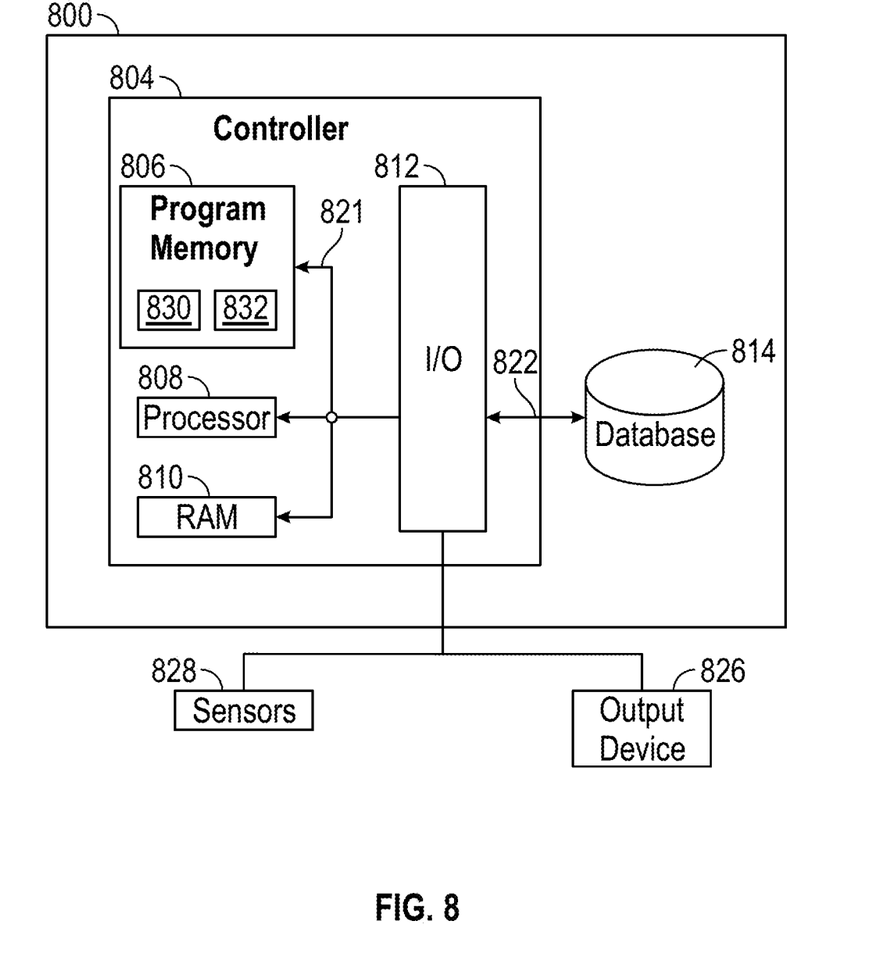
FIG. 8 is a functional block diagram of a computer system.

FIG. 8 is a functional block diagram of a computer system. In certain embodiments, the ECM 80 is implemented by a computer system such as computer system 800. The computer system 800 may have a controller 804 operatively connected to a database 814 via a link 822 connected to an input/output (I/O) circuit 812. It should be noted that, while not shown, additional databases 814 may be linked to the controller 804 in a known manner. Furthermore, these databases 814 may be external to the computer system 800.

The controller 804 can include a program memory 806, the processor 808 (may be called a microcontroller or a microprocessor), a random-access memory (RAM) 810, and the input/output (I/O) circuit 812, all of which are interconnected via an address/data bus 821. It should be appreciated that although only one microprocessor 808 is shown, the controller 804 may include multiple microprocessors 808. Similarly, the memory of the controller 804 may include multiple RAMs 810 and multiple program memories 806. Although the I/O circuit 812 is shown as a single block, it should be appreciated that the I/O circuit 812 may include a number of different types of I/O circuits. The RAM(s) 810 and the program memories 806 may be implemented as semiconductor memories, magnetically readable memories, nonvolatile memories, and/or optically readable memories, for example.

The program memory 806 and RAM 810 can be a non-transitory computer-readable medium having stored thereon computer-executable code (e.g., disclosed software modules or subroutines) and/or data. The program memory 806 and/or the RAM 810 may store various applications (i.e., machine readable instructions) for execution by the microprocessor 808. For example, an operating system 830 may generally control the operation of the computer system 800 and provide a computing environment to implement the processes described herein. The program memory 806 and/or the RAM 810 may also store a variety of software modules 832 for accessing specific functions of the computer system 800. The software modules 832 can be, for example, subroutines.

In addition to the controller 804, the computer system 800 may include other hardware resources. The computer system 800 may also include various types of input/output hardware such as the output device 826 and sensors 828 In an embodiment, the output device 826 can be the actuators 190 that are controlled by processes performed by of one of the software modules 832. The software modules 832 may include other software modules, for example, interfacing with other hardware in the computer system 800, engine system 5, etc. In an embodiment, the sensors 828 can be the pressure gauge 17, the CIP sensor 19, the turbo speed sensor 21, and the MAP sensor 27, and other sensors not shown. The controller 804 can receive information from the sensors 828 to be used in the processes performed by the software modules 832. In an embodiment, the software modules 832 can perform the processes shown in FIGS. 2-7 to generate the compressor out pressure 210, the compressor in pressure 250, the transient flag 370, the downshift transient flag 550, the add turbo flag 410, the downshift turbos 510, and the remove turbo flag 610. The software modules 832 can run at various time loops. For example, the software modules 832 can run at a 15 ms task rate. In other examples the software modules 832 can run at a variety of task rates.

The software modules 832 may include software modules to execute any of the operations described herein. The program memory 806 and/or the RAM 810 may further store data related to the configuration and/or operation of the computer system 800, and/or related to the operation of one or more software modules 832.

INDUSTRIAL APPLICABILITY

The present disclosure generally applies to method for sequential turbocharger 100 control for an engine system 5. The described embodiments are not limited to use in conjunction with a particular type of engine system 5, but rather may be applied to stationary or motive engine systems 5, or any variant thereof. Engine system 5, and thus their components, may be suited for any number of industrial applications, such as, but not limited to, various aspects of the marine industry, power generation industry, cogeneration, aerospace and transportation industry, to name a few examples.

Turbochargers 100 can provide advantageous effects for an engine system 5 by increasing the amount of air 10 available for combustion. However, at low load speed and load conditions, there is not enough exhaust energy to spool up the turbochargers 100 to provide the boost benefit if too many turbochargers 100 are already running. By removing some of the operating turbochargers 100, a larger supply of exhaust energy is supplied to the remaining turbochargers 100 so that that can spool up and provide boost. Once the boosting effects start building, the exhaust energy increases and additional turbochargers 100 can be added in.

Furthermore, the optimal amount of air 10 to provide varies during engine operation, and rapid change in engine speed 345 can result in the strain on the engine 50 caused by the turbochargers 100 exceeding the benefit they provide. These issues can be mitigated with effective control strategies, but known strategies fail to suitably account for and synthesize all key inputs, resulting in suboptimal performance and undesirable smoke emissions, particularly during rapid acceleration and gear shift. The described ECM 80 can synthesize data from manifold pressure monitoring, transient condition detection, and downshift flag tracking to optimize performance of engine systems 5 with multiple turbochargers 100.

Figure 9:
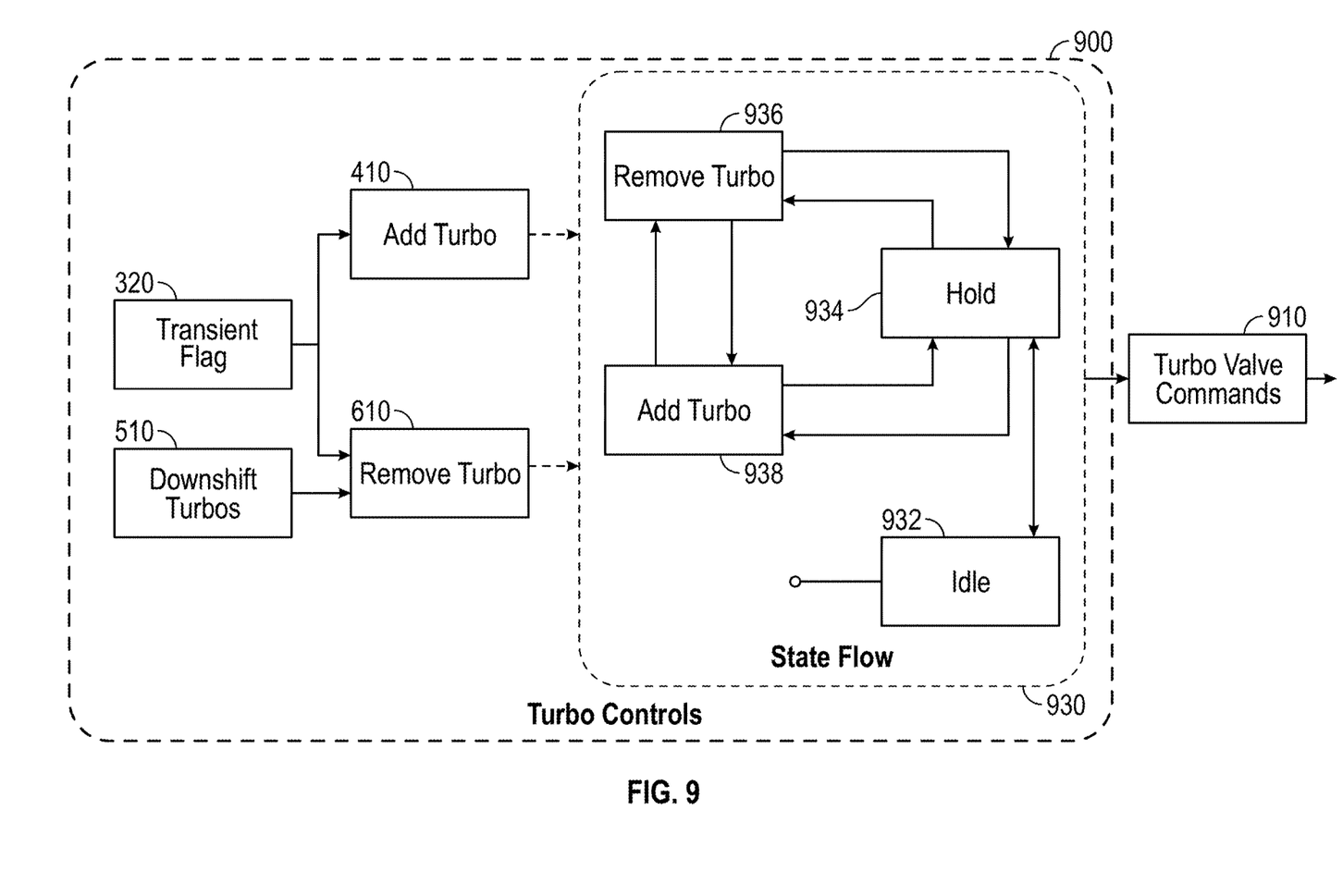
FIG. 9 is a state diagram illustrating different turbocharger states.

FIG. 9 is a state diagram illustrating different turbocharger states. The ECM 80 can execute turbo controls 900 that provide turbo valve commands 910 to the actuators 190 of the turbochargers 100. The actuators 190 control the position of the turbine valve 160 and compressor valve 180 based on the received turbo valve commands 910. If the actuators 190 open the turbine valves 160, those respective turbochargers 100 are considered running. If the actuators 190 close the turbine valves 160, those respective turbochargers 100 are considered removed. In an embodiment, there are six operable turbochargers 100 and a minimum number of turbochargers 100 operating can be equal to two. In another example, there are three operable turbochargers 100 and a minimum number of turbochargers 100 equal to one.

The turbo controls 900 can include the processes for generating the transient flag 370, the downshift flag 510, the add turbo flag 410, and the remove turbo flag 610. The turbo controls 900 can include a state flow 930. In an embodiment, the state flow 930 includes an idle state 932, a hold state 934, a remove turbo state 936, and an add turbo state 938.

During the idle state 932, all turbochargers 100 can be running on engine system 5 startup. The engine system 5 can go into a "non-work mode" with the transmissions (not shown) of the engine system 5 being in neutral, in which case, the all turbochargers 100 can be running and the state flow 930 remains in an idle state 932. The state flow 930 may not move out of the idle state 932 unless features of the engine system 5 reach a set temperature. This can mitigate potential problems associated with operating in cold ambient temperatures, such as slow valve movement due to cold oil. In an example the set temperature may be approximately 40 degrees Celsius. For example, if the measured temperature of the engine 50 is below 40 degrees Celsius, the state flow 930 may not move out of idle state 932. In other embodiments the set temperature can be greater or less than 40 degrees Celsius.

During the idle state 932, the actuators 190 of the turbochargers 100 can be periodically cycled opened and closed to mitigate sticking of the valves 160, 180. All turbochargers 100 can remain running until the engine speed 345 exceeds a set low idle speed over a set debounce time. When the engine speed 345 exceeds low idle speed over the set debounce time, the state flow 930 can transition from the idle state 932 to the hold state 934. The idle state 932 can transition to the hold state 934 after a specified time, such as a set load timer threshold. The idle state 932 can transition to the hold state 934 if an acceleration event occurs.

From the hold state 934, turbochargers 100 can transition to being added, removed, or remain as is. Before transitioning to a remove turbo state 936, the hold state 934 can include a coolant temperature threshold check. If the state flow 930 shifts from all turbochargers 100 operating to a minimum number of turbochargers 100 operating and the coolant temperature threshold has not be crossed, there could be significant damage to the engine system 5 hardware by closing the valves 160, 180. The state flow 930 can transition from the hold state 934 to the remove turbo state 936 if the coolant temperature threshold is met, a remove turbo flag 610 is active, and there are more turbochargers 100 active than the minimum number of turbochargers 100 required for engine system 5 operation. The state flow 930 can transition from the hold state 934 to the add turbo state 938 if all turbochargers 100 are not already running and an add turbo flag 410 is active. In other words, at least one of the turbochargers 100 needs to be inactive/dropped to allow a turbocharger 100 to be added. The state flow 930 can transition from the hold state 934 to the idle state if the engine speed 345 drops below an engine shutdown speed threshold. The state flow 930 can transition from the hold state 934 to the idle state 932 if the engine speed 345 drops below a low idle speed threshold for a set amount of time.

During the remove turbo state 936, the turbo valve commands 910 are sent to the actuators 190 to remove one of the turbochargers 100. After one of the turbochargers 100 is removed, there is a debounce time between transitioning from the remove turbo state 936 to the hold state 934 or the add turbo state 938. This debounce time can help provide the engine 50 enough time to settle down before taking further action.

During the add turbo state 938, the turbo valve commands 910 are sent to one of the actuators 190 to add one of the turbochargers 100. After one of the turbochargers 100 is added, there is a debounce time between transitioning from the add turbo state 938 to the hold state 934 or the remove turbo state 936. This debounce time can help provide the engine 50 enough time to settle down before taking further action.

A map and/or numbering system can be assigned to each of the turbochargers 100. This map/numbering system can be used to cycle between which turbochargers 100 are added and dropped during engine system 5 operation. This can mitigate wear down of specific turbochargers 100 and the underutilization of other turbochargers 100.

The preceding detailed description is merely exemplary in nature and is not intended to limit the invention or the application and uses of the invention. The described embodiments are not limited to use in conjunction with a particular type of engine system 5 or process. Hence, although the present disclosure, for convenience of explanation, depicts and describes particular embodiments of the engine system 5, it will be appreciated that the engine system 5 in accordance with this disclosure can be implemented in various other configurations. Any explanation in connection with one embodiment applies to similar features of other embodiments, and elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for controlling an engine system with a plurality of turbochargers, at least one turbocharger of the plurality of turbochargers having a turbine, a compressor, a turbo speed sensor, a turbine outlet valve disposed in an exhaust outlet passage of the turbine, a compressor inlet valve disposed in an air inlet passage of the compressor, and actuators operable to change a position of the turbine outlet valve to opened and closed positions and to change a position of the compressor inlet valve to the closed position, the method comprising:
   receiving an engine speed;
   generating a speed difference magnitude based on a desired speed and the engine speed;
   generating a transient flag if the speed difference magnitude is greater than a transient detection speed error threshold;
   generating a total mass airflow value that is indicative of a total mass flow of air through an intake manifold of the engine system;
   generating a corrected mass flow per turbocharger using the total mass airflow value;
   generating a compressor out pressure and a compressor in pressure;
   generating a pressure ratio based on the compressor out pressure and the compressor in pressure;
   using a mass air flow threshold correlation of the at least one turbocharger to convert the pressure ratio into a mass flow threshold, the mass flow threshold being indicative of a threshold amount of air mass flow through the at least one turbocharger; and
   in response to the transient flag being generated, controlling the actuators to change the position of the turbine outlet valve based on a comparison between the corrected mass flow per turbocharger to the mass flow threshold.

2. The method of claim 1, further comprising controlling the actuators to open the turbine outlet valve if the mass flow threshold is less than the corrected mass flow per turbocharger.

3. The method of claim 1, further comprising:
   using a first order low pass filter to convert the desired speed into a filtered desired speed value;
   generating a desired speed difference magnitude based on the desired speed and the filtered desired speed; and
   generating the transient flag if the desired speed difference magnitude is greater than a transient detection desired speed difference, the transient detection desired speed difference being a difference in desired engine speed that defines a threshold of engine speed transience.

4. The method of claim 1, further comprising:
   generating a maximum turbo speed that is indicative of a maximum rotational speed of the turbine; and
   in response to the transient flag being generated, controlling the actuators to open the turbine outlet valve if the maximum turbo speed is greater than a turbo speed threshold.

5. The method of claim 4, further comprising, in response to the transient flag being generated, controlling the actuators to close the turbine outlet valve and the compressor inlet valve
   if the corrected mass flow per turbocharger is less than a remove turbo mass flow threshold, and if the maximum turbo speed is not greater than the turbo speed threshold.

6. The method of claim 1, further comprising detecting at least one turbocharger of the plurality of turbochargers not being used in operation of the engine system.

7. The method of claim 2, further comprising, in response to the transient flag not being generated:
receiving a current number of active turbochargers;
receiving a fuel amount;
generating a steady state number of active turbochargers based on the engine speed and the fuel amount, the steady state number of active turbochargers being indicative of a target number of active turbochargers; and
controlling the actuators based on a comparison between the current number of active turbochargers and the steady state number of active turbochargers.

8. An engine control module for controlling a plurality of turbochargers in an engine system, at least one turbocharger of the plurality of turbochargers having a turbine, a compressor, a turbine outlet valve disposed in an exhaust outlet passage of the turbine, a compressor inlet valve disposed in an air inlet passage of the compressor, and an actuator operable to open and close the turbine outlet valve and close the compressor inlet valve, the engine control module comprising:
at least one processor; and
a memory storing software that, when executed by the at least one processor causes the engine control module to
receive an engine speed,
generate a speed difference magnitude based on a desired speed and the engine speed,
generate a transient flag if the speed difference magnitude is greater than a transient detection speed error threshold,
generate a total mass airflow value that is indicative of a total mass flow of air through an intake manifold of the engine system,
generate a corrected mass flow per turbocharger using the total mass airflow value,
generate a compressor out pressure and a compressor in pressure,
generate a pressure ratio based on the compressor out pressure and the compressor in pressure,
use a mass air flow threshold correlation of the at least one turbocharger to convert the pressure ratio into a mass flow threshold, the mass flow threshold being indicative of a threshold amount of air mass flow through the at least one turbocharger, and
in response to the transient flag being generated, control the actuator to open the turbine outlet valve if the corrected mass flow per turbocharger is greater than the mass flow threshold.

9. The engine control module of claim 8, wherein the memory further stores software that, when executed by the at least one processor, causes the engine control module to:
use a first order low pass filter to convert the desired speed into a filtered desired speed value,
generate a desired speed difference magnitude based on the desired speed and the filtered desired speed, and
generate the transient flag if the desired speed difference magnitude is greater than a transient detection desired speed difference, the transient detection desired speed difference being a difference in desired engine speed that defines a threshold of engine speed transience.

10. The engine control module of claim 8, wherein the memory further stores software that, when executed by the at least one processor, causes the engine control module to
generate an effective mass flow per turbocharger;
generate a difference of mass flow based the effective mass flow per turbocharger and the mass flow threshold;
compare the difference of mass flow to a downshift allow mass flow threshold;
receive a fuel amount;
generate a downshift number of turbochargers based on the engine speed, the fuel amount, and a downshift correlation; and
compare a current number of active turbochargers to the downshift number of turbochargers.

11. The engine control module of claim 10, wherein the memory further stores software that, when executed by the at least one processor, causes the engine control module to control the actuators to close the turbine outlet valve and the compressor inlet valve if a downshift transient flag is active, and if the difference of mass flow is greater than the downshift allow mass flow threshold, and if the current number of active turbochargers is greater than the downshift number of turbochargers.

12. The engine control module of claim 8, wherein the memory further stores software that, when executed by the at least one processor, causes the engine control module to:
generate a maximum turbo speed that is indicative of a maximum rotational speed of the turbine; and
in response to the transient flag being generated, control the actuators to open the turbine outlet valve if the maximum turbo speed is greater than a turbo speed threshold.

13. The engine control module of claim 12, wherein the memory further stores software that, when executed by the at least one processor, causes the engine control module to control the actuators, in response to the transient flag being generated, to close the turbine outlet valve and the compressor inlet valve if the corrected mass flow per turbocharger is greater than a remove turbo mass flow threshold and if the turbo speed threshold is greater than the maximum turbo speed.

14. A non-transitory computer-readable medium having instructions stored therein for controlling an engine system with a plurality of turbochargers, at least one turbocharger of the plurality of turbochargers having a turbine, a compressor, a turbo speed sensor, a turbine outlet valve disposed in an exhaust outlet passage of the turbine, a compressor inlet valve disposed in an air inlet passage of the compressor, and actuators operable to change a position of the turbine outlet valve to opened and closed positions and the compressor inlet valve to a closed position, wherein the instructions, when executed by a processor, cause the processor to:
receive an engine speed;
generating a speed difference magnitude based on a desired speed and the engine speed;
generating a transient flag if the speed difference magnitude is greater than a transient detection speed error threshold;
generate a total mass airflow value that is indicative of a total mass flow of air through an intake manifold of the engine system;
generate a corrected mass flow per turbocharger using the total mass airflow value;
generate a compressor out pressure and a compressor in pressure;

generate a pressure ratio based on the compressor out pressure and the compressor in pressure;

generate a mass flow threshold based on a mass air flow threshold correlation of the at least one turbocharger and the pressure ratio, the mass flow threshold being indicative of a threshold amount of air mass flow through the at least one turbocharger; and in response to generating the transient flag, control the actuators to change the position of the turbine outlet valve based on comparing the corrected mass flow per turbocharger to the mass flow threshold.

15. The non-transitory computer-readable medium of claim 14, wherein the instructions, when executed by a processor, further cause the processor to:

generate a filtered desired speed value based on the desired speed and a first order low pass filter;

generate a desired speed difference magnitude based on the desired speed and the filtered desired speed;

generate the transient flag if the desired speed difference magnitude is greater than a transient detection desired speed difference, the transient detection desired speed difference being a difference in desired engine speed that defines a threshold of engine speed transience;

generate a speed difference magnitude based on the desired speed and the engine speed; and generate the transient flag if a transient detection speed error threshold is less than the speed difference magnitude.

16. The non-transitory computer-readable medium of claim 14, wherein the instructions, when executed by a processor, further cause the processor to:

detect if an idle cylinder cut flag is generated;

receive a fuel amount;

generate an idle cylinder cut steady state number of turbochargers based on the engine speed, the fuel amount, and an idle cylinder cut steady state number of turbochargers correlation;

generate a steady state number of turbochargers based on the engine speed, the fuel amount, and a steady state number of turbochargers correlation; and in response to the idle cylinder cut flag being generated, generate a hysteresis steady state number of turbochargers by processing the idle cylinder cut steady state number of turbochargers and the steady state number of turbochargers through hysteresis.

17. The non-transitory computer-readable medium of claim 16, wherein the instructions, when executed by a processor, further cause the processor to control the actuators to open the turbine outlet valve if a current number of active turbochargers is less than the hysteresis steady state number of turbochargers and control the actuators to close the turbine outlet valve and the compressor inlet valve if the current number of active turbochargers is greater than the hysteresis steady state number of turbochargers.

18. The non-transitory computer-readable medium of claim 14, wherein the instructions, when executed by a processor, further cause the processor to control the actuators, in response to the transient flag being generated, to open the turbine outlet valve if the mass flow threshold is less than the corrected mass flow per turbocharger.

19. The non-transitory computer-readable medium of claim 14, wherein the instructions, when executed by a processor, further cause the processor to:

generate a maximum turbo speed that is indicative of a maximum rotational speed of the turbine; and control the actuators, in response to the transient flag being generated, to open the turbine outlet valve if the maximum turbo speed is greater than a turbo speed threshold.

20. The non-transitory computer-readable medium of claim 14, wherein the instructions, when executed by a processor, further cause the processor to control the actuators, in response to the transient flag being generated, to close the turbine outlet valve and the compressor inlet valve if the corrected mass flow per turbocharger is less than a remove turbo mass flow threshold and if a maximum turbo speed is not greater than a turbo speed threshold.

* * * * *